United States Patent
Block et al.

(10) Patent No.: US 6,818,235 B2
(45) Date of Patent: Nov. 16, 2004

(54) BENEFICIAL CONTROL OF ENERGY BALANCE IN PERIPARTURIENT CATTLE

(75) Inventors: Elliot Block, Yardley, PA (US); William K. Sanchez, Tigard, OR (US); Kenneth R. Cummings, Skillman, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 368 days.

(21) Appl. No.: 10/017,248

(22) Filed: Dec. 14, 2001

(65) Prior Publication Data

US 2003/0113363 A1 Jun. 19, 2003

(51) Int. Cl.$^7$ .............................................. A23K 1/175
(52) U.S. Cl. ............................. 426/2; 426/74; 426/807; 424/442
(58) Field of Search .............................. 426/2, 74, 807; 424/442

(56) References Cited

U.S. PATENT DOCUMENTS

| | | | |
|---|---|---|---|
| 4,642,317 A | 2/1987 | Palmquist et al. | 514/558 |
| 5,391,788 A | 2/1995 | Vinci et al. | 554/156 |
| 5,456,927 A | 10/1995 | Vinci et al. | 426/74 |
| 5,547,686 A | 8/1996 | Jenkins | 426/2 |
| 5,874,102 A | 2/1999 | LaJoie et al. | 424/438 |
| 6,299,913 B1 * | 10/2001 | Block et al. | 426/2 |
| 6,485,765 B1 * | 11/2002 | Block et al. | 426/74 |
| 6,521,249 B2 * | 2/2003 | Block et al. | 424/442 |
| 2002/0176883 A1 * | 11/2002 | Block et al. | 424/442 |

OTHER PUBLICATIONS

Lundeen, Feedstuffs, vol. 73 (47), pp. 8, Nov. 12, 2001.*

* cited by examiner

*Primary Examiner*—C. Sayala
(74) *Attorney, Agent, or Firm*—Stephen B. Shear

(57) ABSTRACT

The present invention provides a method for beneficial control of body condition and dietary energy balance in dairy cattle during colostrum milk production. An important aspect of the beneficial control is the provision of a feedstock which has a supplemented content of trans-10, cis-12 conjugated linoleic acid derivative having rumen-bypass properties. The ingested quantity of CLA derivative ingredient per cow is effective for lowering and maintaining the fat content of colostrum milk in the range between about 4–6 weight percent and for increasing milk yield. The presence of cis-9, trans-11 conjugated linoleic acid structural isomer in an invention feedstock is minimized, because it counteracts the beneficial effects of the trans-10, cis-12 conjugated linoleic acid structural isomer, such as reduction in milk yield.

11 Claims, No Drawings

BENEFICIAL CONTROL OF ENERGY BALANCE IN PERIPARTURIENT CATTLE

BACKGROUND OF THE INVENTION

This invention generally relates to dietary factors with respect to postpartum dairy cattle nutrition. More specifically, this invention relates to beneficial control of body condition and energy balance in dairy cattle during colostrum milk production after calving.

There are numerous dairy science publications which elaborate theory and practice in connection with the biology of dairy cattle during a prepartum-postpartum transition period.

The time span from three weeks before to three weeks after dairy cattle parturition (i.e., the "periparturient" period) is critically important to health, production, and profitability of the cows. Most infectious diseases and metabolic disorders occur during this periparturient period, such as milk fever, ketosis, retained fetal membranes, metritis, and displaced abomasum. Immunosuppression during the periparturient period leads to increased susceptibility to mastitis.

Occurrences of periparturient diseases and disorders in dairy cattle have lasting negative impacts on milk yield during lactation, in addition to the cost of lost saleable milk during treatment for a disorder and the cost of veterinary care. Extreme negative energy balance and extensive loss of body condition during the periparturient period also can challenge subsequent reproductive success.

Relatively little is known about fundamental biological processes during this dairy cattle prepartum-postpartum transition period. Knowledge of key control points in hepatic metabolism of long-chain fatty acids is lacking, as is an insight into the metabolic effects of hormones, growth factors, and cytokines that mediate stress. Increased understanding of the biology of the periparturient period should serve to decrease lactating cattle health problems and increase profitability of dairy operations.

During the early lactation phase of postpartum cows, there is a severe negative energy balance which stresses the body condition and predisposes the animals to ketosis and reduced productive performance. An important factor in the early lactation energy drain effect is the production of colostrum milk with a milk fat content as high as ten weight percent.

Of particular interest with respect to the present invention are reported studies in connection with nutrition as the predominant environmental factor affecting milk fat content during lactation, and the role of nutrition as a practical vehicle for altering the yield and composition of milk fat. The effect of feedstock on the yield and composition of milk fat is described in publications which include J. Dairy Sci., 72, 2801 (1989); J. Dairy Sci., 74, 3244 (1991); and J. Dairy Sci., 76, 1753 (1993).

There is continuing interest in the development of new and improved supplemented feedstocks and protocols for enhancing the health and productivity of dairy cattle during the periparturient period.

Accordingly, it is an object of this invention to provide a formulated high-energy feedstock for beneficial feeding of dairy cattle during the periparturient period.

It is another object of this invention to provide a feedstock which is adapted for decreasing the dietary energy balance deficit in postpartum cattle, and for reducing the milk fat content of colostrum milk during initial lactation.

It is another object of this invention to provide a method for beneficial control of body condition and dietary energy balance in dairy cattle during colostrum milk production after calving.

It is a further object of this invention to provide a method for increasing the milk yield over the lactating cycle of dairy cattle by beneficial control of dietary energy partitioning.

Other objects and advantages of the present invention shall become apparent from the accompanying description and example.

DESCRIPTION OF THE INVENTION

One or more objects of the present invention are accomplished by the provision of a method for beneficial control of body condition and dietary energy partition for increased milk yield in dairy cattle during colostrum milk production after calving, which method comprises feeding the postpartum dairy cattle with a feedstock comprising (1) a high-energy nutritionally-balanced ration adapted for postpartum lactating dairy cattle, and having a dietary cation-anion difference (DCAD) between about 0–60 meq/100 g dietary DM; and (2) conjugated linoleic acid derivative having rumen-bypass properties, and provided in a daily quantity which is effective for lowering and maintaining the milk fat content of colostrum milk in the range between about 4–6 weight percent.

The invention method of feeding the postpartum dairy cattle is effective for managing a dietary energy balance deficit of less than about −10 Mcal/cow/day during colostrum production.

In a further embodiment the present invention provides a feedstock for beneficial control of dietary energy balance deficit in postpartum dairy cattle at a level less than about −10 Mcal/cow/day during colostrum milk production, which feedstock comprises (1) a high-energy nutritionally-balanced ration adapted for postpartum lactating dairy cattle, and having a dietary cation-anion difference (DCAD) between about 0–60 meq/100 g dietary DM; and (2) between about 0.3–1 gram/kg dietary DM of conjugated linoleic acid derivative having rumen-bypass properties, and which derivative comprises trans-10, cis-12 structural isomer, and which contains less than about 20 weight percent of cis-9, trans-11 structural isomer.

The high-energy nutritionally balanced ration component of an invention feedstock is custom formulated for intensive feeding of dairy cattle after calving. A ration component is isocaloric and isonitrogenous, and preferably includes a content of slow-release degradable nitrogen source for efficient rumen fermentation, and a content of rumen-bypass protein.

A typical ration can include about 14–20 percent of crude protein, about 30–40 percent of rumen-bypass protein, and about 1–12 percent of slow-release degradable nitrogen source, based on dry matter. The net carbohydrate and protein system of the ration component of the feedstock is maintained in optimal balance.

The following basal ration illustrates the nutrient constituents of a feedstock suitable for the practice of the present invention:

| Nutrients | Dry Weight % |
|---|---|
| Soybean meal (49% CP) | 3.25 |
| Oats | 9.30 |
| Molasses | 2.30 |
| Min/vit | 1.40 |
| Grass hay | 16.00 |
| Bypass protein | 3.00 |
| Slow-release NPN | 2.25 |
| Corn silage | 16.00 |
| Cracked corn | 25.00 |
| Hayage | 19.00 |

In the transition period before calving, the feedstock for dairy cattle preferably has a dietary cation-anion difference (DCAD) value between about −15 and zero meq/100 g dietary DM.

After calving, an invention feedstock preferably has a dietary cation-anion difference (DCAD) value between about 0–60 meq/100 g dietary DM, to suppress metabolic disorders such as the onset of hypocalcemia and metabolic acidosis in the lactating dairy cattle.

The term "dietary cation-anion difference (DCAD)" was coined to represent the mathematical calculation (W. K. Sanchez and D. K. Beede. Page 31, Proc. Florida Rum. Nutr. Conf. Univ. of Florida. 1991). Expressed in its fullest form, DCAD is written as follows:

$$meq[(Na^+ + K^+ + Ca^{+2} + Mg^{+2}) - (Cl^- + SO_4^{-2} + PO_4^{-3})]/100 \text{ g of dietary dry matter (DM)}.$$

A problem with including the multivalent macrominerals (Ca, Mg, P and S) in the DCAD expression for ruminants relates to the variable and incomplete bioavailability of these ions compared to Na, K and Cl. The expression employed most often in ruminant nutrition is the monovalent cation-anion difference:

$$meq(Na^+ + K^+ - Cl^-)/100 \text{ g dietary DM}$$

Because of the additional use of sulfate salts in dairy cattle rations, the expression that has gained most acceptance in lactating cow nutrition, and practiced in the present invention, is as follows:

$$meq(Na^+ + K^+) - (Cl^- + SO_4^{-2})/100 \text{ g dietary DM}$$

An essentially required ingredient of a present invention feedstock is a quantity of rumen-bypass conjugated linoleic acid (CLA) derivative which is effective for lowering and maintaining the milk fat content of colostrum milk in the range between about 4–6 weight percent. An effective rumen-bypass ingredient comprises trans-10, cis-12 conjugated linoleic acid derivative.

The quantity of conjugated linoleic acid derivative having rumen-bypass properties in a feedstock typically is between about 0.3–1 ram CLA/kg dietary DM. Preferably the feeding regimen is at a rate which provides between about 5–15 grams CLA/cow/day; and which effectively provides between about 4–12 grams CLA/cow/day in the cow intestine of trans-10, cis-12 conjugated linoleic acid rumen-bypass derivative during the colostrum milk production period. Normally the CLA additive is fed to the dairy cattle from about 5–10 days prepartum to about 35–40 days postpartum.

With respect to the inhibition of fat synthesis and the lowering of the fat content of colostrum milk, trans-10, cis-12 conjugated linoleic acid and cis-8, trans-10 conjugated linoleic acid derivatives are effective for reducing the activities of key lipogenic enzymes, and thereby decreasing rates of lipogenesis. The cis-9, trans-11 linoleic acid isomer has little or no effect on the expression of fat synthetase in lactating cattle.

An important aspect of the present invention is an increase in milk yield in dairy cattle which is directly attributable to the metabolic effect of conjugated linoleic acid such as the trans-10, cis-12 structural isomer. The milk yield over the lactating cycle of the dairy cattle can be increased by about 14–22 percent with the trans-10, cis-12 conjugated linoleic acid structural isomer having rumen-bypass properties.

Optimal milk yields are achieved when the added conjugated linoleic acid directive in a feedstock contains less than about 20 weight percent of cis-9, trans-11 conjugated linoleic acid structural isomer, and preferably less than about 5 weight percent. The counter-productive milk yield effect in dairy cattle of cis-9, trans-11 conjugated linoleic acid appears to be related to the cell proliferation regulatory properties of this structural isomer.

When the mammary gland develops prior to first calving and immediately prior to each subsequent calving (and the ensuing lactation), the gland is composed of a certain number of "stem cells". These stem cells are the undifferentiated cells of the mammary gland that will differentiate into secretory cells known as mammocytes. These cells go through a life cycle, and at this undifferentiated stage they resemble a cancer cell which is an undifferentiated or de-differentiated cell-type. High milk production depends on having a large number of these stem cells divide and differentiate into functional mammocytes.

Cis-9, trans-11 conjugated linoleic acid has anti-carcinogenic properties. A cancer cell is undifferentiated, and has unregulated growth. Cis-9, trans-11 conjugated acid can impart growth regulation to cancer cells. It is believed that by a similar regulatory mechanism cis-9, trans-11 congugated linoleic acid inhibits mammary stem cells from dividing and differentiating into functional mammocytes. This effect is countercurrent to the beneficial increase in milk yield obtained with trans-10, cis-12 conjugated linoleic acid.

To achieve its beneficial effects as a feedstock additive, it is essential that the conjugated linoleic acid derivative has rumen-bypass capability. The conjugated linoleic acid derivative can be in the form of CLA alkaline earth metal salt, such as calcium and/or magnesium salt. The derivative also can be in the form of CLA amide, in which the amide nitrogen is substituted with hydrogen and/or aliphatic radicals. Fatty acid salts and amides having rumen-bypass properties are described in publications such as U.S. Pat. Nos. 4,642,317; 4,826,694; 5,391,788; 5,425,693; 5,456,927; 5,496,572; 5,547,686; 5,670,191; 5,874,102; and the like, incorporated by reference.

Optionally, the CLA can be rumen-protected when in the form of polymer-encapsulated matrix. Typically, the polymer is a continuous film coating that functions as an impermeable barrier under rumen conditions. Suitable polymers include gum arabic, polyvinylpyrrolidone, polyacrylamide, polyvinyl acetate, cellulose acetate, zein, shellac, and the like.

An optional biologically active ingredient can be included in an invention feedstock in an effective quantity between about 0.05–20 weight percent, based on the dry matter weight of the feedstock. It can be selected from a broad variety of nutrients and medicaments, either as a single component or a mixture of components, which are illustrated by the following listing of active ingredients:

1. acid-base buffers which typically are selected from carbonate and phosphate salts, and which serve to moderate and control the dietary anion-cation difference (DCAD) of an invention feedstock, and to reduce the rate and extent of biohydrogenation of free fatty acids in the rumen.
2. sugars and complex carbohydrates which include both water-soluble and water-insoluble monosaccharides, disaccharides and polysaccharides.

Cane molasses is a byproduct from the extraction of sucrose from sugar cane. It is commercially available at standard 79.5° Brix concentration, which has a water content of about 21 weight percent, and a sugar content of 50 weight percent. Sugar beet byproducts also are available as low cost carbohydrate sources.

Whey is a byproduct of the dairy industry. The whey is a dilute solution of lactalbumin, lactose, fats, and the soluble inorganics from milk. Dried whey solids typically have the following composition:

| | |
|---|---|
| Protein | 12.0% |
| Fat | 0.7% |
| Lactose | 60.0% |
| Phosphorus | 0.79% |
| Calcium | 0.874% |
| Ash | 9.7% |

Another source of carbohydrate is derived from the pulp and paper industry which produces large quantities of byproduct lignin sulfonates from wood during the sulfite pulping process. The carbohydrate byproduct is a constituent of the spent sulfite liquor.

3. aminoacid ingredients either singly or in combination which include arginine, histidine, isoleucine, leucine, lysine, methionine, phenylalanine, threonine, tryptophan, valine, tyrosine ethyl HCl, alanine, aspartic acid, sodium glutamate, glycine, proline, serine, cysteine ethyl HCl, and the like, and analogs and salts thereof.
4. vitamin ingredients either singly or in combination which include thiamine HCl, riboflavin, pyridoxine HCl, niacin, niacinamide, inositol, choline chloride, calcium pantothenate, biotin, folic acid, ascorbic acid, vitamin $B_{12}$, p-aminobenzoic acid, vitamin A acetate, vitamin K, vitamin D, vitamin E, and the like.

Trace element ingredients include compounds of cobalt, copper, manganese, iron, zinc, tin, nickel, chromium, molybdenum, iodine, silicon, vanadium and selenium.

5. protein ingredients as obtained from sources such as dried blood or meat meal, dried and sterilized animal and poultry manure, fish meal, liquid or powdered egg, fish solubles, cell cream, soybean meal, cottonseed meal, canola meal, and the like.

Protein ingredients include non-protein nitrogen compounds such as urea, biuret, ammonium phosphate, and the like.

6. antioxidants as illustrated by butylated hydroxyanisole, butylated hydroxytoluene, tocopherol, tertiary-butylhydroquinone, propyl gallate, and ethoxyquin; and suitable preservatives include sodium sorbate, potassium sorbate, sodium benzoate, propionic acid, α-hydroxybutyric acid, and the like.
7. suspension stabilizing agents which preferably are selected from nonionic surfactants, hydrocolloids and cellulose ethers. These types of chemical agents are illustrated by polyethylene oxide condensates of phenols, $C_8$–$C_{22}$ alcohols and amines; ethylene oxide reaction products with fatty acid partial esters of hexitans; alkylarylpolyoxyethylene glycol phosphate esters; gum arabic; carob bean gum; tragacanth gum; ammonium, sodium, potassium and calcium alginates; glycol alginates; xanthan gum; potato agar; alkylcellulose; hydroxyalkylcellulose; carboxyalkylcellulose; and the like.

Practice of the present invention embodiments provides manifold advantages for managing postpartum cattle.

There is increased feed intake, which helps minimize the nutritional deficit during colostrum milk production after calving.

Dairy cattle suffer less stress and body weight loss, and there is less susceptability to ketosis and hypocalcemia.

The milk fat content of colostrum milk produced by postpartum dairy cattle is lowered and maintained in the range between about 4–6 weight percent.

Postpartum dairy cattle can have an onset dietary energy balance deficit level improved to less than about −5 Mcal/cow/day within about 3–5 weeks after lactation onset.

In accordance with the present invention postpartum dairy cattle achieve an increase in first lactation milk production and lifetime milk, and can manifest improved reproductive performance.

The following Example is further illustrative of the present invention. The components and specific ingredients are presented as being typical, and various modifications can be derived in view of the foregoing disclosure within the scope of the invention.

EXAMPLE

The Example illustrates the health benefits and increased milk yield obtained by feeding postpartum dairy cattle with rumen-bypass trans-10, cis-12 conjugated linoleic acid derivative in accordance with the present invention.

One hundred and twenty Holstein cows who were to begin their second or greater lactation are randomly selected to receive one of four Conjugated Linoleic Acid (CLA) supplementation regimens. Control cows receive no supplemental CLA (0 CLA), cows offered Treatment 1 receive the cis-9, trans-11 CLA isomer (9, 11 CLA), cows offered Treatment 2 receive the trans-10, cis-12 CLA isomer (10, 12 CLA) and cows offered Treatment 3 receive both isomers in a 50:50 mix (mixed CLA).

Isomers of CLA are obtained at 85% purity and are converted to their amide form (unsubstituted) for a rumen bypass rate of 65%. The remaining 15% of the 85% pure CLA isomers are the other isomers of CLA. Treatments 1 and 2 are formulated to deliver 7 grams of each CLA isomer per cow/day at the intestinal level. Therefore, 13 g/cow/day of the respective CLA amides are included in the daily rations offered as Total Mixed Rations (TMR) (i.e., 13 g CLA amide×85% purity×65% rumen bypass=7.18 g intestinal CLA isomer). Treatment 3 is formulated to deliver 7 grams of both isomers per cow per day in the intestine resulting in a 26 g supplement.

Cows are fed their CLA treatments beginning 7 days prepartum and remain on the supplement until 35 days postpartum. The pre- and postpartum diets are listed in Tables 1 and 2. To maintain the diets isoenergetic with equal amounts of added fat to the diets, the CLA amides are substituted for Megalac (calcium salts of palm fatty acids). Postpartum diets are offered immediately postpartum.

Prepartum diets are formulated to meet or exceed NRC (2000) requirements at a daily intake of 10.6 kg of DM. This is done to assure that all feed is consumed in a 24-hour period. Postpartum diets are also formulated to meet or exceed requirements for a cow producing (ca.) 45 kg of milk daily at ad libitum consumption of DM.

Cows are milked four times per day to assure maximum expression of production potential and are housed and fed in individual tie-stalls to obtain individual estimates of DMI.

At day 15 postpartum five of the 30 cows per treatment are sacrificed with their mammary glands excised for analysis of total parenchymal DNA and the RNA-to-DNA ratio.

Other measurements include: Start-up milk production (defined as colostrum milk secreted in the first 24 hours postpartum) analyzed for milk fat and fatty acid composition; Daily milk production and composition (total fat and protein); Daily dry matter intake (DMI); Calculated net energy balance defined as net energy intake minus net energy secreted in milk expressed in megacalories (Mcal) per day.

RESULTS

All feed is consumed in the prepartum period on a daily basis except on days 2 prepartum through day of calving. Intake of DM is too variable between groups to determine any significant differences for these days.

Postpartum DMI is not significantly different between treatments and begin at 11.1 kg/d and rise up to 22 kg/d by day-35 postpartum. Therefore, there are no differences in net energy intake between dietary treatments.

Total parenchymal DNA is (compared to 0 CLA group) 18% lower, 8% greater and 10% lower for the 9, 11 CLA, the 10, 12 CLA, and the mixed CLA groups, respectively. The 10, 12 CLA group is significantly ($P<0.01$) higher than the other two CLA supplemented cows but not different from control cows. Ratio of RNA-to-DNA is lowest for the mixed CLA and 10, 12 CLA groups ($P<0.05$).

Table 3 summarizes production parameters for all groups. Calculated average energy balance postpartum is actual daily DMI minus actual daily milk energy outputs.

INVENTION ADVANTAGES

One important attribute of the 10, 12 CLA isomer is to reduce fatty acid synthesis. This is obvious from the total amount of milk fat produced and from the ratio of short plus medium chain fatty acids-to-long chain fatty acids in milk fat from Table 3. Cows supplemented with 10, 12 CLA and with the mixed CLA both reduce milk fat primarily by slowing down mammary synthesis of the short and medium chain fatty acids resulting in a majority of the milk fat arising from long chain fatty acids circulating in the blood. Further evidence is the reduced RNA-to-DNA ratio in both groups receiving the 10,12 CLA isomer. The reduced RNA per cell is likely related to the enzyme system associated with milk fatty acid synthesis. In the first 24 hours postpartum, the reduction of fat corrected milk production results in animals having a positive energy balance when they are primarily consuming the 10, 12 CLA isomer, likely avoiding excessive body fat mobilization during this critical period. By avoiding the negative energy balance in this first 24 hours postpartum the cows supplemented with the 10, 12 CLA isomer are able to produce more total milk and fat corrected milk than all other groups, including the group fed the 10, 12 CLA plus 9, 11 CLA isomers.

The 9, 11 CLA isomer is attributed with reduced incidence of the induction and proliferation of cancer cells. Cancer cells are dividing cells with similar properties to stem cells that mistakenly differentiate into cells that cannot control their growth. As the mammary glands contain a population of undifferentiated cells (stem cells) that must differentiate into mammocytes (milk secretory cells) in the periparturient period, it is hypothesized that the 9, 11 CLA isomer prevents this differentiation process leading to less secretory cells in the mammary gland when the isomer is present in high enough levels. This hypothesis is supported by the lower amounts of DNA found in the mammaries of both groups that received the 9, 11 CLA isomer.

TABLE 1

Composition of prepartum diets in kg of DM/cow/day. Values in parentheses are expressed as a percentage of the total dietary DM.

| INGREDIENT | 0 CLA | 9, 11 CLA | 10, 12 CLA | MIXED CLA |
|---|---|---|---|---|
| Alfalfa hay | 2.0 | 2.0 | 2.0 | 2.0 |
|  | (18.9) | (18.9) | (18.9) | (18.9) |
| Corn Silage | 5.4 | 5.4 | 5.4 | 5.4 |
|  | (50.9) | (50.9) | (50.9) | (50.9) |
| Ground Corn | 1.8 | 1.8 | 1.8 | 1.8 |
|  | (17.0) | (17.0) | (17.0) | (17.0) |
| Biochlor* | 0.96 | 0.96 | 0.96 | 0.96 |
|  | (9.06) | (9.06) | (9.06) | (9.06) |
| Megalac** | 0.11 | .097 | .097 | .084 |
|  | (1.03) | (0.92) | (0.92) | (0.79) |
| CLA amide supplement | 0 | .013 | .013 | .026 |
|  | (0) | (0.12) | (0.12) | (0.25) |
| Vit-Min premix | 0.33 | 0.33 | 0.33 | 0.33 |
|  | (3.11) | (3.11) | (3.11) | (3.11) |
| NUTRIENT |  |  |  |  |
| Crude protein, % | 15.8 | 15.8 | 15.8 | 15.8 |
| Nel (Mcal/kg) | 1.67 | 1.67 | 1.67 | 1.67 |
| NDF, % | 36 | 36 | 36 | 36 |
| DCAD, meq/100 g | −8 | −8 | −8 | −8 |

*Biovance Technologies, Omaha, NE
**Church & Dwight Co., Inc., Princeton, NJ

TABLE 2

Composition of postpartum diets in kg of DM/cow/day. Values in parentheses are expressed as a percentage of the total dietary DM.

| INGREDIENT | 0 CLA | 9, 11 CLA | 10, 12 CLA | MIXED CLA |
|---|---|---|---|---|
| Alfalfa hay | 3.18 | 3.18 | 3.18 | 3.18 |
|  | (13.35) | (13.35) | (13.35) | (13.35) |
| Corn silage | 7.48 | 7.48 | 7.48 | 7.48 |
|  | (31.46) | (31.46) | (31.46) | (31.46) |
| Soybean hulls | 0.98 | 0.98 | 0.98 | 0.98 |
|  | (4.12) | (4.12) | (4.12) | (4.12) |
| Ground corn | 5.72 | 5.72 | 5.72 | 5.72 |
|  | (24.05) | (24.05) | (24.05) | (24.05) |
| Soybean meal | 1.80 | 1.80 | 1.80 | 1.80 |
|  | (7.57) | (7.57) | (7.57) | (7.57) |
| Blood meal | 0.36 | 0.36 | 0.36 | 0.36 |
|  | (1.53) | (1.53) | (1.53) | (1.53) |
| Brewers grains, wet | 1.66 | 1.66 | 1.66 | 1.66 |
|  | (6.99) | (6.99) | (6.99) | (6.99) |
| Vit-Min premix | 0.65 | 0.65 | 0.65 | 0.65 |
|  | (2.72) | (2.72) | (2.72) | (2.72) |
| Fermenten* | 0.91 | 0.91 | 0.91 | 0.91 |
|  | (3.81) | (3.81) | (3.81) | (3.81) |
| Megalac** | 0.25 | 0.237 | 0.237 | 0.224 |
|  | (1.05) | (0.996) | (0.996) | (0.942) |
| Megalac Plus** | 0.25 | 0.25 | 0.25 | 0.25 |
|  | (1.05) | (1.05) | (1.05) | (1.05) |
| CLA amide supplement | 0 | 0.013 | 0.013 | 0.026 |
|  | (0) | (0.055) | (0.055) | (0.11) |
| Sodium Bicarbonate | 0.35 | 0.35 | 0.35 | 0.35 |
|  | (1.47) | (1.47) | (1.47) | (1.47) |
| Potassium Carbonate | 0.2 | 0.2 | 0.2 | 0.2 |
|  | (0.84) | (0.84) | (0.84) | (0.84) |

TABLE 2-continued

Composition of postpartum diets in kg of DM/cow/day. Values in parentheses are expressed as a percentage of the total dietary DM.

| INGREDIENT | 0 CLA | 9, 11 CLA | 10, 12 CLA | MIXED CLA |
|---|---|---|---|---|
| NUTRIENT | | | | |
| Crude protein, % | 18 | 18 | 18 | 18 |
| Nel (Mcal/kg) | 1.85 | 1.85 | 1.85 | 1.85 |
| NDF, % | 30.2 | 30.2 | 30.2 | 30.2 |
| DCAD, meq/100 g | +42 | +42 | +42 | +42 |

*Biovance Technologies, Omaha, NE
**Church & Dwight Co., Inc., Princeton, NJ

TABLE 3

Milk production statistics for the first 24 hours postpartum startup milk (colostrum) and the average for the next 34 days postpartum. FCM (Fat Corrected Milk) is milk product corrected to a fat content of 4%.

| STATISTIC | 0 CLA | 9, 11 CLA | 10, 12 CLA | MIXED CLA |
|---|---|---|---|---|
| Startup milk (kg) | 24.1b | 20.2a | 25.3c | 23.6b |
| Startup milk fat % | 8.6c | 8.9c | 4.9a | 6.1b |
| Startup milk fat kg | 1.73c | 1.44b | 1.15a | 1.19a |
| SCFA + MCFA: LCFA* | 25:75b | 28:72.b | 12:88a | 19:81a |
| Startup FCM (kg) | 40.73d | 35.05c | 28.72a | 31.03b |
| Calculated energy balance at the end of day-1 postpartum (Mcal) | −7.6a | −3.6b | +0.72d | −0.88c |
| Milk (kg/d) | 42.6b | 40.2a | 47.2d | 44.8c |
| Milk fat % | 3.42a | 3.45a | 2.99b | 3.02b |
| SCFA + MCFA: LCFA* | 56.44b | 58.42b | 39.61a | 43.57a |
| Milk fat (kg/d) | 1.11b | 1.04a | 1.11b | 1.05a |
| FCM (kg/d) | 38.89b | 36.88a | 40.05c | 38.21b |
| Calculated average energy blance postpartum (Mcal/d) | −1.4c | −1.1c | −.21a | −.72b | abcd: Values in the same row with different superscripts differ significantly (P < .05).
*SCFA + MCFA:LCFA = Ratio of short chain plus medium chain fatty acids in milk fat to long chain fatty acids in milk fat.

What is claimed is:

1. A method for beneficial control of body condition and dietary energy partition for increased milk yield in dairy cattle during colostrum milk production after calving, which method comprises feeding the postpartum dairy cattle with a feedstock comprising: (1) a high-energy nutritionally-balanced ration adapted for postpartum lactating dairy cattle, and having a dietary cation-anion difference (DCAD) value between about −60 meq/100 g dietary DM; and (2) conjugated linoleic acid derivative having rumen-bypass properties, and provided in a daily quantity which is effective for lowering and maintaining the milk fat content of colostrum milk in the range between about 4–6 weight percent.

2. A method in accordance with claim 1 wherein the dietary energy balance deficit of the dairy cattle is less than about −10 Mcal/cow/day during colostrum milk production.

3. A method in accordance with claim 1 wherein the ration has a content of rumen-bypass protein, and slow-release degradable nitrogen source for efficient rumen fermentation.

4. A method in accordance with claim 1 wherein the quantity of effective conjugated linoleic acid derivative in the feedstock is in the range between about 0.3–1 gram CLA/kg dietary DM.

5. A method in accordance with claim 1 wherein the conjugated linoleic acid derivative is in the form of calcium salt and/or magnesium salt and/or carboxylic acid amide and/or polymer-encapsulated matrix.

6. A method in accordance with claim 1 wherein the effective constituent of the conjugated linoleic acid derivative comprises trans-10, cis-12 structural isomer, and wherein the conjugated linoleic acid derivative comprises less than about 20 weight percent of cis-9, trans-11 structural isomer.

7. A method in accordance with claim 1 wherein the feeding is at a rate which provides between about 5–15 grams CLA/cow/day of effective conjugated linoleic acid derivative as sufficient for beneficial control of body condition and dietary energy partition in the postpartum dairy cattle.

8. A method in accordance with claim 1 wherein the feeding is at a rate which provides between about 4–12 grams/cow/day in the cow intestine of trans-10, cis-12 conjugated linoleic acid rumen-bypass derivative.

9. A method in accordance with claim 1 wherein the milk yield over the lactating cycle of the dairy cattle is increased between about 14–22 percent.

10. A feedstock adapted for beneficial control of the dietary energy balance deficit in postpartum dairy cattle at a level less than about 10 Mcal/cow/day during colostrum milk production, which feedstock comprises (1) a high-energy nutritionally-balanced ration adapted for postpartum lactating dairy cattle, and having a dietary cation-anion difference (DCAD) between about 0–60 meq/100 g dietary DM; and (2) between about 0.3–1 gram/kg dietary DM of conjugated linoleic acid derivative having rumen-bypass properties, and which derivative comprises trans-10, cis-12 structural isomer, and which contains less than about 20 weight percent of cis-9, trans-11 structural isomer.

11. A feedstock in accordance with claim 10 wherein the conjugated linoleic acid derivative is in the form of calcium salt and/or magnesium salt and/or carboxylic acid amide and/or polymer-encapsulated matrix.

* * * * *